(No Model.)
W. S. REYNOLDS.
DELIVERY CART.
No. 562,914. Patented June 30, 1896.
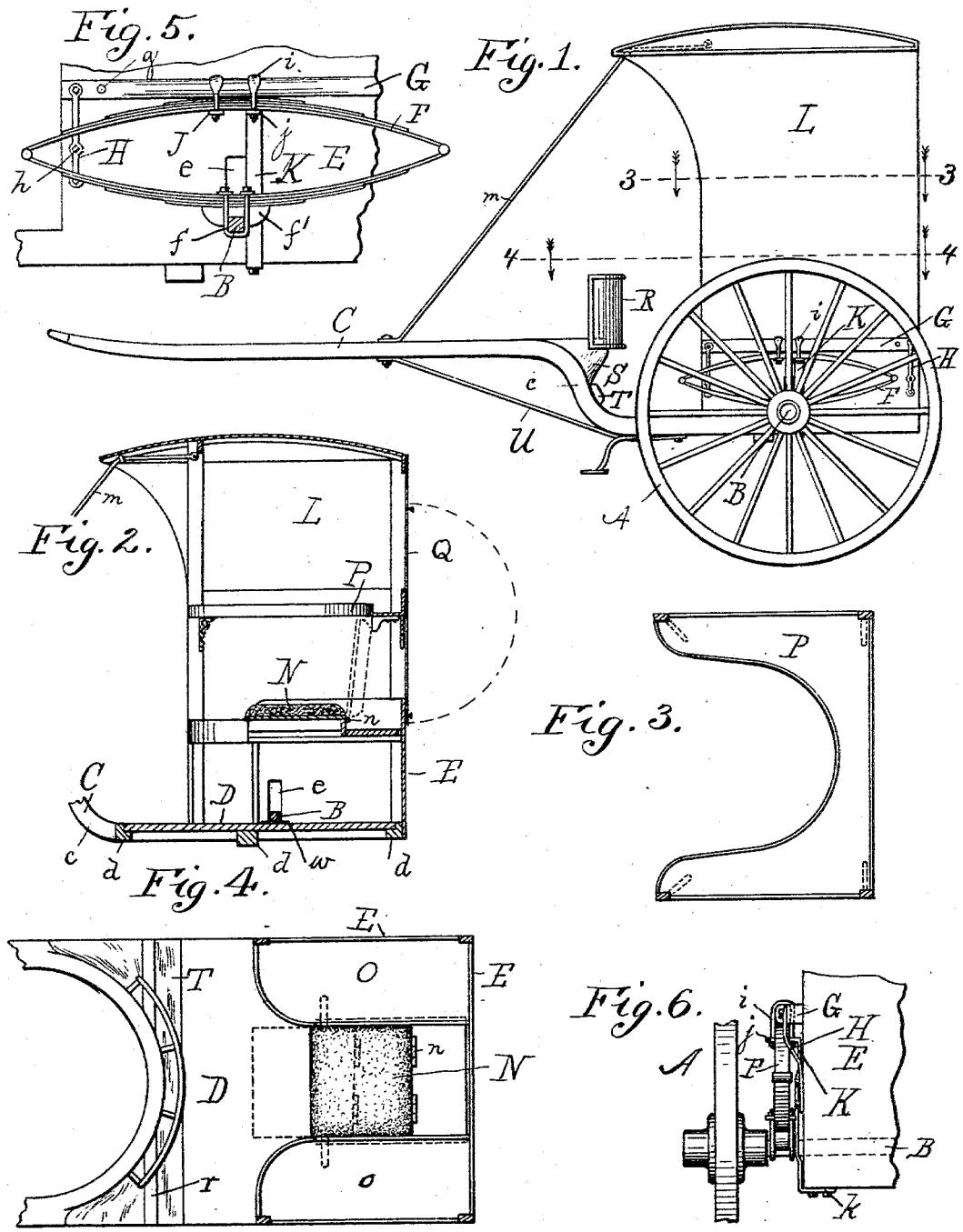
Witnesses:
R. J. Jacker.
A. W. Munday.
Inventor:
Walter S. Reynolds
By Munday, Evarts & Adcock,
His Attys.

UNITED STATES PATENT OFFICE.

WALTER S. REYNOLDS, OF DE KALB, ILLINOIS, ASSIGNOR TO MADISON D. SHIPMAN, CHARLES E. BRADT, AND SAMUEL E. BRADT, OF SAME PLACE.

DELIVERY-CART.

SPECIFICATION forming part of Letters Patent No. 562,914, dated June 30, 1896.

Application filed April 29, 1893. Serial No. 472,364. (No model.)

*To all whom it may concern:*

Be it known that I, WALTER S. REYNOLDS, a citizen of the United States, residing in De Kalb, in the county of De Kalb and State of Illinois, have invented a new and useful Improvement in Delivery-Carts, of which the following is a specification.

This invention relates to improvements in carts used for delivering parcels, and is especially adapted to the use of the butchers, grocers, and dry-goods men, whose packages are generally small and light.

The objects of my invention are, first, to produce a light, covered, one-horse, two-wheeled vehicle, provided with abundant shelving within immediate and convenient reach of the driver, and, further, to provide a low-down floor which shall be located on a plane below the axis of the wheels of the cart and down within easy and convenient reach of the ground, so that the exertion required in stepping in or out will be less than with ordinary carts; also, to provide and attach springs to the body of the cart and to the axle in such a manner that it will allow the most perfect freedom of the entire body and load in their action; to provide stays running from the upper portion of the top to the thills, so that the jerky motion of the top and the horse motion of the body of the cart is reduced to a minimum; to provide plenty of room for easy access and egress on either side of the cart into and in front of the top between the wheels and dash and the down bend of the thills; to provide side bunting-irons to prevent the backward and side thrust of the axle; to provide a straight axle running through the body of the cart, on which the springs are mounted and which plays through openings or slots in the sides of the body; to provide an adjustable seat whereby the weight of the driver may be shifted so as to equalize the load in the cart.

In the drawings, Figure 1 is a side elevation of my improved cart. Fig. 2 is a central longitudinal vertical section thereof. Figs. 3 and 4 are longitudinal sections on the lines 3 3 and 4 4, respectively, of Fig. 1. Fig. 5 is a partial vertical section, and Fig. 6 is a partial rear elevation.

In said drawings, A represents the carrying-wheels, of which there are two, and B represents a straight axle connecting the wheels.

C C are the thills, having a bend at $c$, by which the rear ends of the thills are permitted to occupy a plane below that of the axle.

D represents the floor of the cart resting upon the rear ends of the thills and also upon cross-pieces $d$, extending from one thill to the other. The body or box of the cart, which is shown at E, is provided with vertical openings or slots $e$ in its sides, and the axle is passed through these openings. Normally when the cart has no load the axle will be in the lower portion of these openings, as indicated at Fig. 2, and the openings are of such height as to allow the body to play up and down the distance permitted by the springs.

F F are the supporting-springs, and they are clipped to the upper side of the axle at either side of the cart-body by the clips $f$, bearing-pieces $f'$ being preferably interposed between the axle and the under surface of the springs to give the latter a wide bearing, said bearing-pieces being also adapted to straddle the axle, which is angular in cross-section, and thus prevent any rocking by the spring.

The body of the cart is attached to the upper side of the springs by the following devices: Horizontal bars G, which bow outwardly at their centers, are secured to the body at their ends by bolts or rivets $g$, and also preferably by vertical straps H, the lower ends of which are bolted to the body, as at $h$. Over the central or bowed portion of this bar are placed the clips $i$, by which the spring is united to the bar. J $j$ represent the clamping-plates of said clips, and are passed beneath the upper leaves of the spring. Of these, the plate $j$ is integral with a supporting-strap K, extending down along the side of the cart-body with its lower end bent under and bolted to the same, as shown at $k$. By means of this strap I transmit the major portion of the weight to the spring and relieve the bar G therefrom.

The construction thus far described enables me to support the body and load of the cart upon springs, notwithstanding the fact that its floor is placed below instead of above the axle.

The straps K, of which there is one at each side of the cart, are located along the rear side of the axle-opening e, so that in the up-and-down movements of the cart-body the axle will press against them, thus furnishing a solid bearing preventing at all times both the rear and sidewise thrust of the axle and preventing the wearing away of the material of the cart-body on that side of the openings where the wear would most likely come.

Above the cart is a suitable canopy or top L, preferably of canvas, supported upon suitable framing. Connecting the front of the top with the thills is a suitable connection, preferably a rod m, which produces a rigid construction of the top and frame and allows the most perfect freedom of up-and-down movements of the entire body of the cart with the springs, thus preventing the jerky motion of the top and also the horse motion of the body of the cart. Within the top and body I place a shifting seat N, hinged to a slide at n, so it may be raised to give access to the inclosed space in the bottom of the cart and also may be slid back and forth to equalize the load of the cart by shifting the weight of the driver to either side of the axle, as desired. At the sides of this seat are shelves O o, and above the seat is another shelf P, extending around the sides and back of the top, the central portion of this latter shelf being cut out to give room for the driver. At the back of the cart-top a portion Q of the canvas is made removable, so as to give access to the interior of the cart from the back. This rear section of canvas may be taken entirely off, or it may be detached from its buttons at the top and allowed to hang down, or it may be detached from the bottom at the bottom and lifted out of the way when access to the cart is needed.

R is the dashboard, which is supported upon the cross-piece r, uniting the thills. The space underneath the dash may be covered with any suitable material, as indicated at S, or a shelf may take the place of the dash. A foot-rail is shown at T. A metal brace-rod U is preferably applied to each of the thills and spans the bend therein, as shown, and acts to stiffen the thills. A rubber cushion w is preferably placed, as shown, to cushion contact between the axle and the floor of the cart. It is readily seen that the springs and bunting-irons K may be placed upon the inside of the body and produce practically the same result.

I claim—

1. The combination of a cart-body, supporting-wheels, an axle passing through the body, thills passing under the axle and rigid with the body, and springs mounted on the axle and attached to the sides of the body, substantially as specified.

2. The combination with the cart-body, of the axle passing through the body, the springs mounted on the axle, the horizontal bars G attached to the sides of the body and clipped to the springs, and the thills attached to the body, substantially as specified.

3. The combination with a cart-body of the axle, thills secured directly to the body and passing under the axle, and springs mounted upon the axle and attached to the sides of the cart-body, substantially as specified.

4. A delivery-cart having a straight axle passing through the cart-body above its floor and through vertically-elongated openings in its sides, thills extending under the axle and supporting the floor of the cart, and springs located outside the body and attached to its sides and supporting the same upon the axle, substantially as specified.

5. A covered delivery-cart, wherein are combined a body having provision for ingress and egress at its sides and in front of the wheels, an axle passing through the body, thills extending under the body and supporting the floor thereof and also passing under the axle, and springs supporting the body from the axle, substantially as specified.

WALTER S. REYNOLDS.

Witnesses:
H. E. ROLFE,
E. O. WOOD.